(12) United States Patent
Park

(10) Patent No.: US 8,440,486 B2
(45) Date of Patent: May 14, 2013

(54) ELECTROPHORETIC DISPLAY DEVICE AND METHOD OF FABRICATING THE SAME

(75) Inventor: Sung-Jin Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 93 days.

(21) Appl. No.: 13/271,880

(22) Filed: Oct. 12, 2011

(65) Prior Publication Data

US 2012/0028392 A1 Feb. 2, 2012

Related U.S. Application Data

(62) Division of application No. 12/554,772, filed on Sep. 4, 2009, now Pat. No. 8,106,399.

(30) Foreign Application Priority Data

Dec. 23, 2008 (KR) ........................ 10-2008-0132541

(51) Int. Cl.
*H01L 21/00* (2006.01)

(52) U.S. Cl.
USPC ............. 438/48; 438/149; 438/151; 438/157; 438/283; 438/128; 257/71

(58) Field of Classification Search .................... 257/71; 438/48, 128, 149, 151, 157, 283
See application file for complete search history.

(56) References Cited

U.S. PATENT DOCUMENTS

| 7,423,712 B2 | 9/2008 | Jeoung et al. |
| 2008/0001154 A1 | 1/2008 | Lee |
| 2008/0259021 A1 | 10/2008 | Choi et al. |
| 2010/0073279 A1 | 3/2010 | Kwon et al. |

FOREIGN PATENT DOCUMENTS

JP 2005-196172 A 7/2005

*Primary Examiner* — Anthony Ho
(74) *Attorney, Agent, or Firm* — Birch, Stewart, Kolasch & Birch, LLP

(57) ABSTRACT

A method of fabricating an electrophoretic display device includes forming a gate line along a direction, a gate electrode extending from the gate line, a common line parallel to the gate line, and a first storage electrode extending from the common line on a substrate, forming a gate insulating layer on an entire surface of the substrate including the gate line, the gate electrode, the common line and the first storage electrode, forming a semiconductor layer, a data line, and source and drain electrodes through a mask process, wherein the semiconductor layer is disposed over the gate electrode, the data line crosses the gate line to define a pixel region, the source electrode extends from the data line, and the drain electrode is spaced apart from the source electrode over the semiconductor layer.

12 Claims, 20 Drawing Sheets

ELECTROPHORETIC DISPLAY DEVICE AND METHOD OF FABRICATING THE SAME

CROSS-REFERENCE TO RELATED APPLICATIONS

This application is a divisional of U.S. patent application Ser. No. 12/554,772 filed on Sep. 4, 2009 now U.S. Pat. No. 8,106,399, which claims the priority to Korean Patent Application No. 10-2008-0132541, filed in Korea on Dec. 23, 2008. The entire contents of each of these applications are hereby incorporated by reference.

BACKGROUND OF THE INVENTION

1. Field of the Invention

The present invention relates to an electrophoretic display device, and more particularly, to an electrophoretic display device having improved uniformity and a method of fabricating the same.

2. Discussion of the Related Art

In general, liquid crystal display (LCD) devices, plasma display panels (PDPs) and organic electro-luminescence displays (OLEDs) have been widely used for display devices. However, recently, to meet consumer's requirements rapidly diversified, various display devices has been introduced.

Particularly, properties of a light weight, thin profile, high efficiency and function for displaying full color moving images have been required in the display devices. To satisfy the properties, electrophoretic display devices, which have merits of papers and other display devices, have been suggested and researched. The electrophoretic display devices use a phenomenon that charged particles move to an anode or a cathode. The electrophoretic display devices have advantages in a contrast ratio, a response time, a full color display, costs, portability, and so on. Differently from the LCD devices, the electrophoretic display devices do not require a polarizer, a backlight unit, a liquid crystal layer, and so on. Accordingly, the electrophoretic display devices have an advantage in production costs.

FIG. 1 is a schematic view of a related art electrophoretic display device to explain a driving principle of the same. In FIG. 1, the related art electrophoretic display device 1 includes a first substrate 11, a second substrate 36 and an ink layer 57 interposed therebetween. The ink layer 57 includes capsules 63, and each capsule 63 has a plurality of white-dyed particles 59 and a plurality of black-dyed particles 61 therein. The white-dyed particles 59 and the black-dyed particles 61 are negatively and positively charged by a condensation polymerization reaction, respectively.

A plurality of pixel electrodes 28, which are connected to a plurality of thin film transistors (not shown), are formed on the first substrate 11, and each pixel electrode 28 is disposed in each pixel region (not shown). A positive voltage or a negative voltage is selectively applied to each of the pixel electrodes 28. When the capsules 63 including the white-dyed particles 59 and the black-dyed particles 61 have various sizes, a filtering process is performed to select the capsules 63 having a uniform size.

When a positive or negative voltage is applied to the ink layer 57, the white-dyed particles 59 and the black-dyed particles 61 in the capsules 63 move towards opposite polarities according to polarities of the applied voltage. Therefore, when the black-dyed particles 61 move upward, a black color is displayed. Alternatively, when the white-dyed particles 59 move upward, a white color is displayed.

FIG. 2 is a cross-sectional view of schematically illustrating an electrophoretic display device according to a related art. In FIG. 2, the related art electrophoretic display device 1 includes a first substrate 11, a second substrate 36 and an electrophoresis film 60 interposed therebetween. The electrophoresis film 60 includes first and second adhesive layers 51 and 53, a common electrode 55 and an ink layer 57. The first and second adhesive layers 51 and 53 face each other and include a transparent material. The common electrode 55 is formed of a transparent conductive material and is disposed on the second adhesive layer 53 to face the ink layer 57. The ink layer 57 is disposed between the first and second adhesive layers 51 and 53. The ink layer 57 includes a plurality of capsules 63, and each capsule 63 has a plurality of white-dyed particles 59 and a plurality black-dyed particles 61 therein. The white- and black-dyed particles 59 and 61 are negatively and positively charged by a condensation polymerization reaction, respectively.

The second substrate 36 includes a transparent material such as plastic or glass. The first substrate 11 includes an opaque material such as stainless steel. As occasion demands, the first substrate 11 may be formed of a transparent material such as plastic or glass. A color filter layer 40 is formed on an inner surface of the second substrate 36. The color filter layer 40 includes red, green and blue color filter patterns.

Gate lines (not shown) and data lines 19 are formed on the first substrate 11 in a matrix shape. The gate lines and the data lines 19 cross each other to define pixel regions P. A thin film transistor Tr is formed at each crossing portion of the gate lines and the data lines 19 in each pixel region P. The thin film transistor Tr includes a gate electrode 13, a gate insulating layer 16, a semiconductor layer 18, a source electrode 20 and a drain electrode 22. The gate electrode 13 extends from the gate line (not shown). The gate insulating layer 16 covers the gate electrode 13. The semiconductor layer 18 overlaps the gate electrode 13 and includes an active layer 18a and ohmic contact layers 18b. The source electrode 20 contacts the semiconductor layer 18 and extends from the data line 19. The drain electrode 22 is spaced apart from the source electrode 22.

A first passivation layer 25 and a second passivation layer 26 are formed on a substantially entire surface of the first substrate 11 including the thin film transistor Tr. The first passivation layer 25 and the second passivation layer 26 include a drain contact hole 27 exposing the drain electrode 22. The first passivation layer 25 is formed of an inorganic insulating material, and the second passivation layer 26 is formed of an organic insulating material.

A pixel electrode 28 is formed on the second passivation layer 26 in each pixel region P. The pixel electrode 28 is connected to the drain electrode 22 through the drain contact hole 27. The pixel electrode 28 is formed of a transparent conductive material, for example, one of indium-tin-oxide (ITO) and indium-zinc-oxide (IZO).

The first substrate 11 including the gate and data lines, the thin film transistor Tr and the pixel electrode 28 may be referred to as an array substrate.

The electrophoretic display device 1 having the above-mentioned structure uses ambient light, for example, natural light or room electric light, as a light source. The electrophoretic display device 1 can display images by inducing a position change of the white-dyed particles 59 and the black-dyed particles 61 in the capsule 63 depending on a polarity of a voltage applied to the pixel electrode 28.

In the electrophoretic display device 1, to drive the array substrate and the ink layer 57 of the electrophoresis film 60 attached thereto, a common voltage and a data voltage are applied to the common electrode 55 and the pixel electrode 28, respectively. A storage capacitor StgC is formed in each pixel region P to maintain a voltage difference between the common electrode 55 and the pixel electrode 28 until a next data voltage is applied. Here, in addition to the ink layer 57, the adhesive layer 51, which has a thickness of about 50 mm to about 60 mm, is interposed between the common electrode 55 and the pixel electrode 28, and thus the electrophoretic display device 1 needs a relatively high driving voltage. Accordingly, to keep the high driving voltage, a storage capacitor StgC having a large capacitance is requested.

FIG. 3 is a plan view showing a pixel region of an array substrate for an electrophoretic display device according to the related art. FIG. 4 is a cross-sectional view along the line IV-IV of FIG. 3.

In FIG. 3 and FIG. 4, a gate line 12 and a data line 19 cross each other to define a pixel region P. A thin film transistor Tr is formed at a crossing portion of the gate and data lines 12 and 19 as a switching element.

A common line 14 is formed parallel to the gate line 12 across the pixel region P. A first storage electrode 15 extends from the common line 14, and a size of the first storage electrode 15 corresponds to most of the pixel region P. A drain electrode 22 of the thin film transistor Tr includes an extending part therefrom, which overlaps the first storage electrode 15 and forms a storage capacitor StgC with a gate insulating layer 16 interposed therebetween. The extending part of the drain electrode 22 becomes a second storage electrode 24. Here, to form the above-mentioned storage capacitor StgC, the second storage electrode 24 has more than a half size of the pixel region P. However, this causes non-uniformity in patterns.

More particularly, the electrophoretic display device may be manufactured by using a mother glass substrate, which includes a plurality of array substrates for respective electrophoretic display devices. To reduce manufacturing processes and costs, a manufacturing method of an array substrate for a liquid crystal display device has been suggested and developed in which source and drain electrodes and a semiconductor layer are formed through one mask process. However, the electrophoretic display device has a different pixel region structure from a conventional liquid crystal display device. Therefore, in electrophoretic display device, if the source and drain electrodes 20 and 22 and the semiconductor layer 18 are formed through a mask process, there exists non-uniformity in patterns on the mother glass substrate, and process defects increase. Accordingly, in electrophoretic display device, the source and drain electrodes 20 and 22 and the semiconductor layer 18 are formed through two mask processes using different masks.

In addition, as stated above, the storage capacitor StgC includes the first storage electrode 15 connected to the common line 14 and the second storage electrode 24 extending from the drain electrode 22. The first storage electrode 15 is formed by using a mask, which includes a light-transmitting portion and a light-blocking portion, and a wet-etching process, and an occupying ratio per unit area is not important. However, when the source and drain electrodes 20 and 22 and the semiconductor layer 18 are formed through one mask process using a diffraction exposure method or a halftone exposure method, the source and drain electrodes 20 and 22 including the second storage electrode 24 are patterned by a dry-etching process using reactive gases. Therefore, an occupying ratio per unit area is important.

While the occupying ratios per unit area of a metallic material for the source and drain electrodes are uniform all over the mother glass substrate for liquid crystal display devices, the occupying ratios per unit area of a metallic material for the source and drain electrodes are not uniform in display areas and in non-display areas of the mother glass substrate for electrophoretic display devices because the electrophoretic display devices include relatively large-sized storage capacitors for high capacitances in the pixel regions.

Accordingly, in the electrophoretic display device, uniformity of the dry-etching process using reactive gases is not guaranteed, and defects increase when the source and drain electrodes 20 and 22 and the semiconductor layer 18 are formed through a mask process.

SUMMARY OF THE INVENTION

Accordingly, the present invention is directed to an electrophoretic display device and method of fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electrophoretic display device includes a gate line on a substrate, a common line parallel to the gate line, a gate insulating layer on the gate line and the common line, a data line on the gate insulating layer, the data line crossing the gate line to define a pixel region, a thin film transistor connected to the gate line and the data line, the thin film transistor including a gate electrode, a semiconductor layer, a source electrode and a drain electrode, a first storage electrode extending from the common line, a first passivation layer over the thin film transistor, the gate line and the data line, the first passivation layer exposing the drain electrode, and a pixel electrode on the first passivation layer, the pixel electrode contacting the drain electrode and overlapping the gate line and the data line, wherein the pixel electrode includes a second storage electrode overlapping the first storage electrode, and the first and second storage electrodes form a storage capacitor with the gate insulating layer interposed therebetween.

In another aspect a method of fabricating an electrophoretic display device includes forming a gate line along a direction, a gate electrode extending from the gate line, a common line parallel to the gate line, and a first storage electrode extending from the common line on a substrate, forming a gate insulating layer on an entire surface of the substrate including the gate line, the gate electrode, the common line and the first storage electrode, forming a semiconductor layer, a data line, and source and drain electrodes through a mask process, wherein the semiconductor layer is disposed over the gate electrode, the data line crosses the gate line to define a pixel region, the source electrode extends from the data line, and the drain electrode is spaced apart from the source electrode over the semiconductor layer, wherein the gate electrode, the semiconductor layer, the source electrode and the drain electrode constitute a thin film transistor, forming a first passivation layer over the gate line, the data line and the thin film transistor, wherein the first passivation layer partially exposes the drain electrode, and forming a pixel electrode on the first passivation layer, wherein the pixel electrode contacts the drain electrode and overlaps the gate line and the data line, wherein the pixel electrode includes a second storage electrode overlapping the first storage electrode, and the first and second storage electrodes form a storage capacitor with the gate insulating layer interposed therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
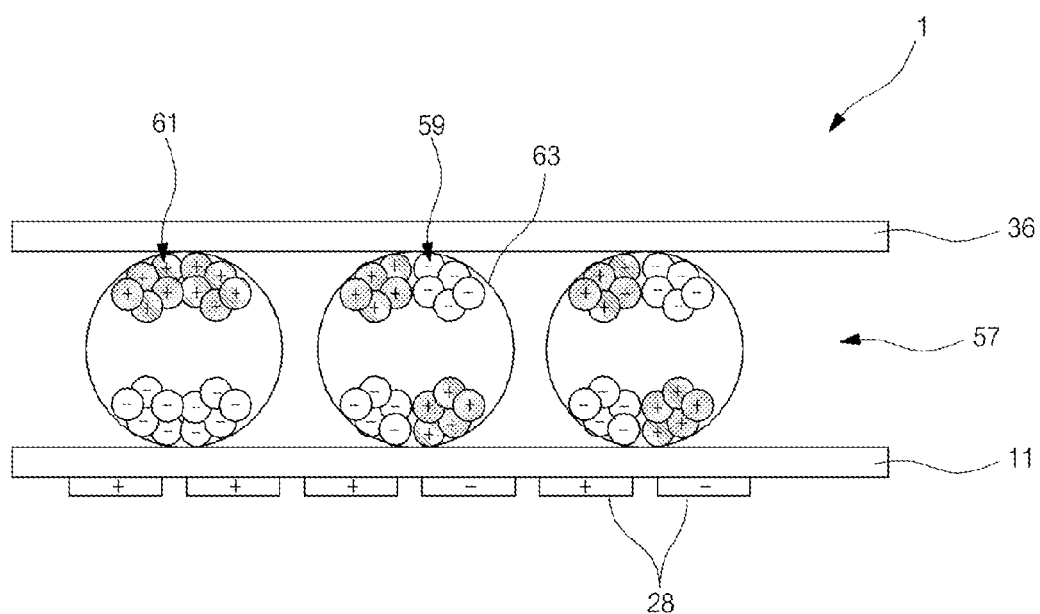
FIG. 1 is a schematic view of a related art electrophoretic display device to explain a driving principle of the same.
Figure 2:
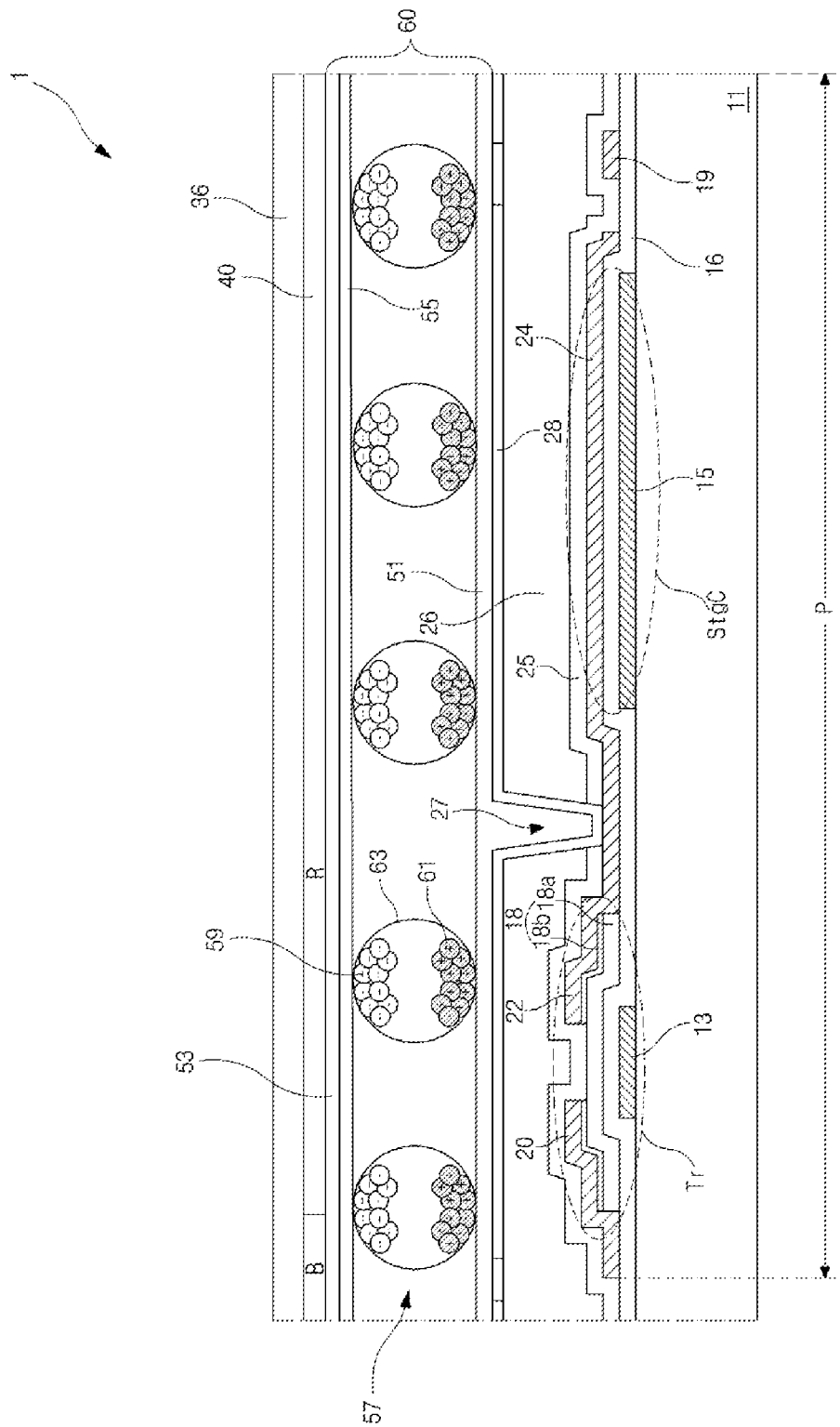
FIG. 2 is a cross-sectional view of schematically illustrating an electrophoretic display device according to a related art.
Figure 3:
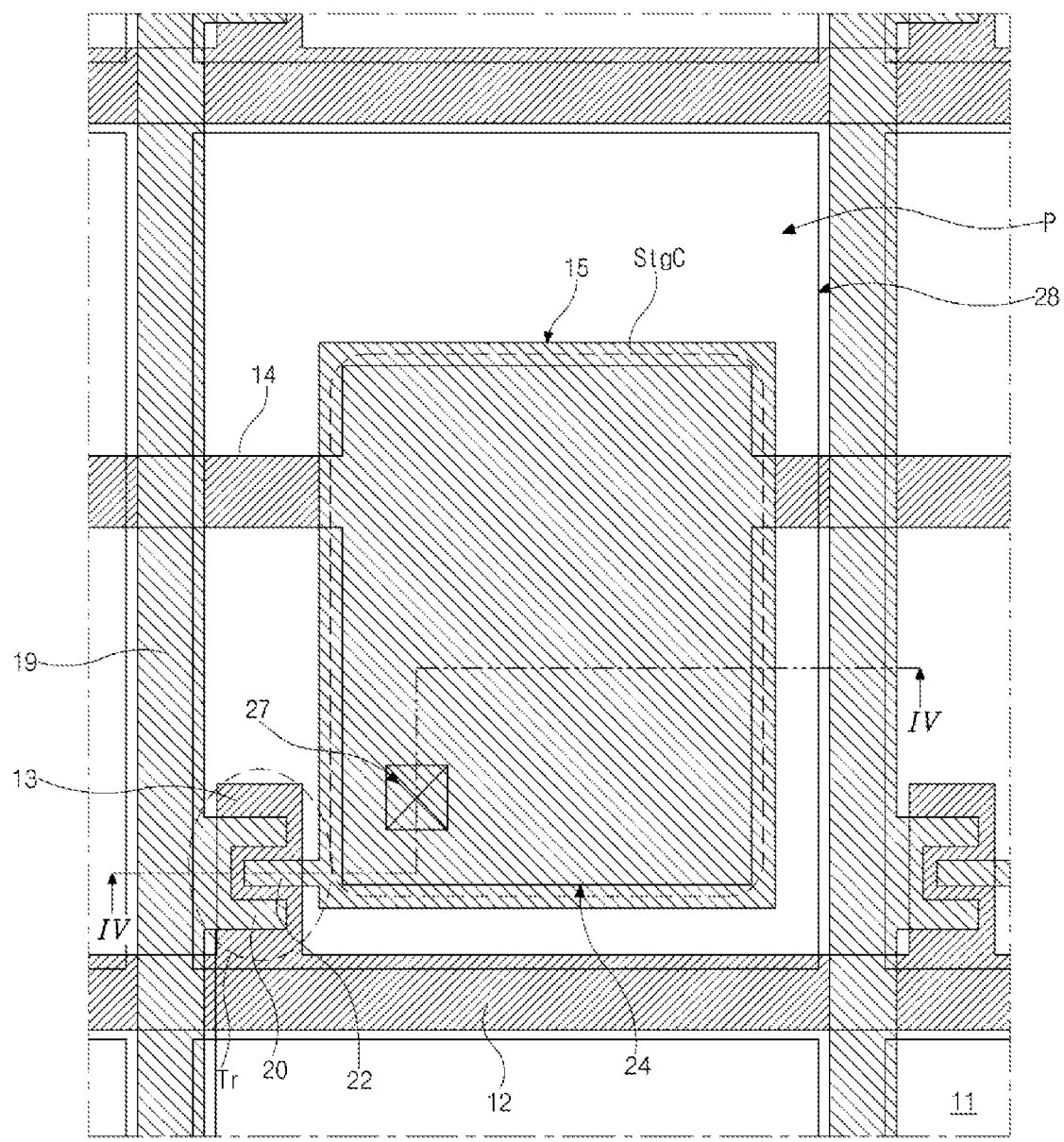
FIG. 3 is a plan view showing a pixel region of an array substrate for an electrophoretic display device according to the related art.
Figure 4:
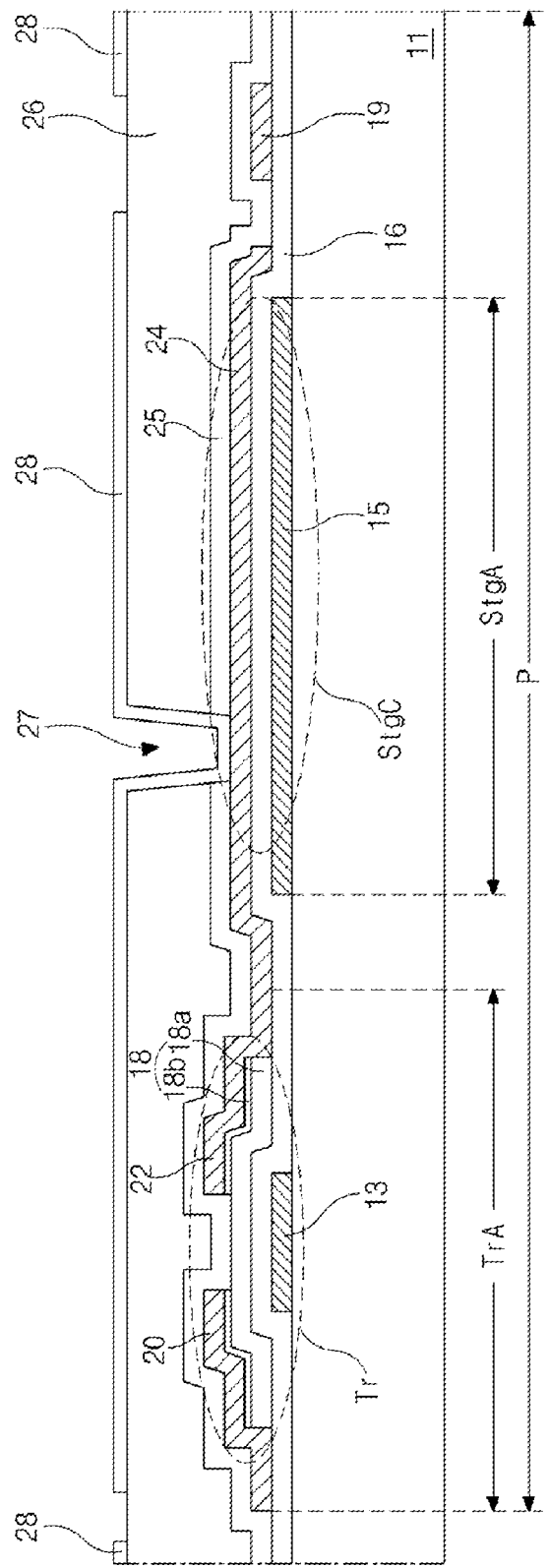
FIG. 4 is a cross-sectional view along the line IV-IV of FIG. 3.
Figure 5:
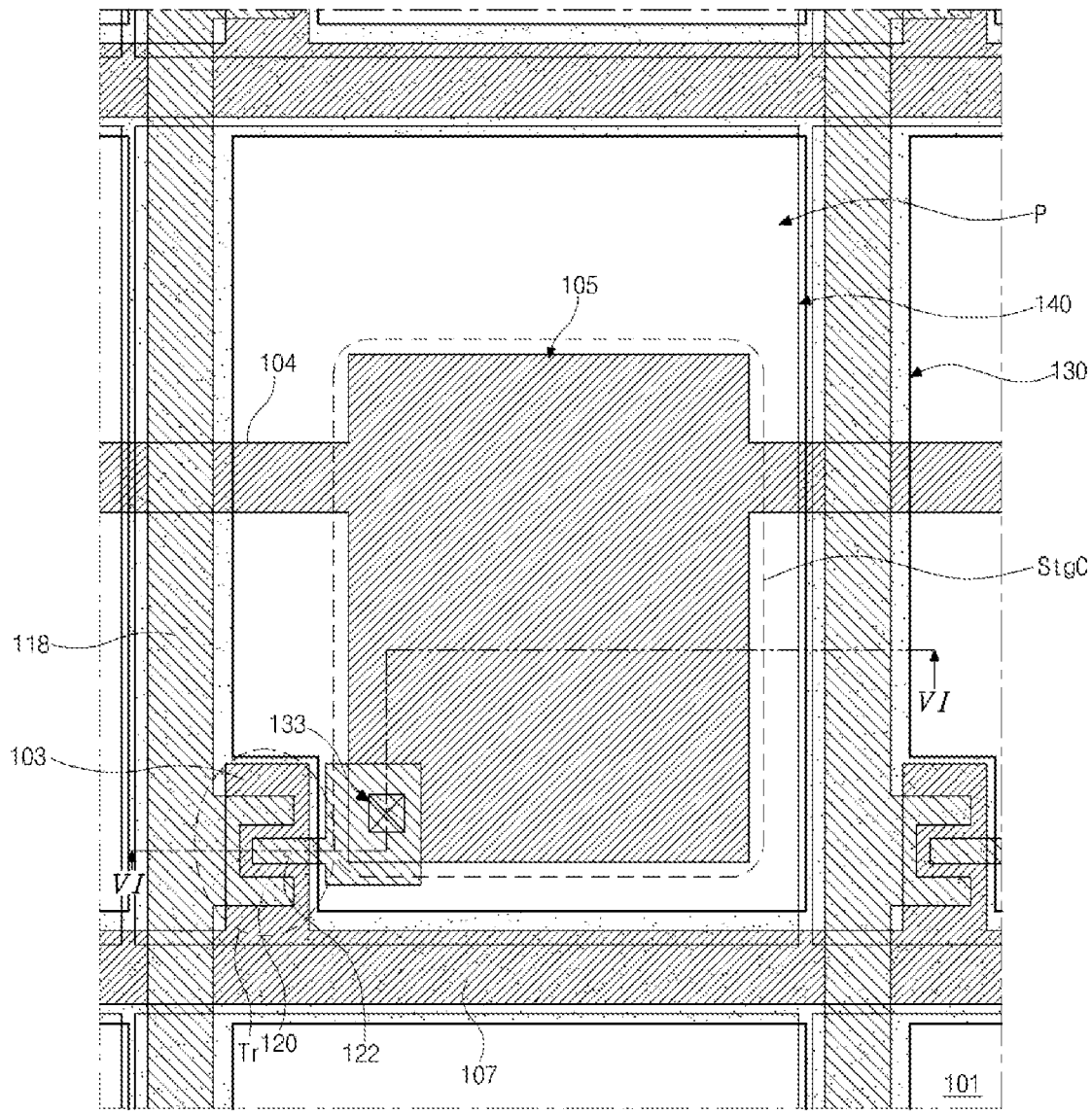
FIG. 5 is a plan view illustrating a pixel region of an array substrate for an electrophoretic display device according to an embodiment of the present invention.
Figure 6:
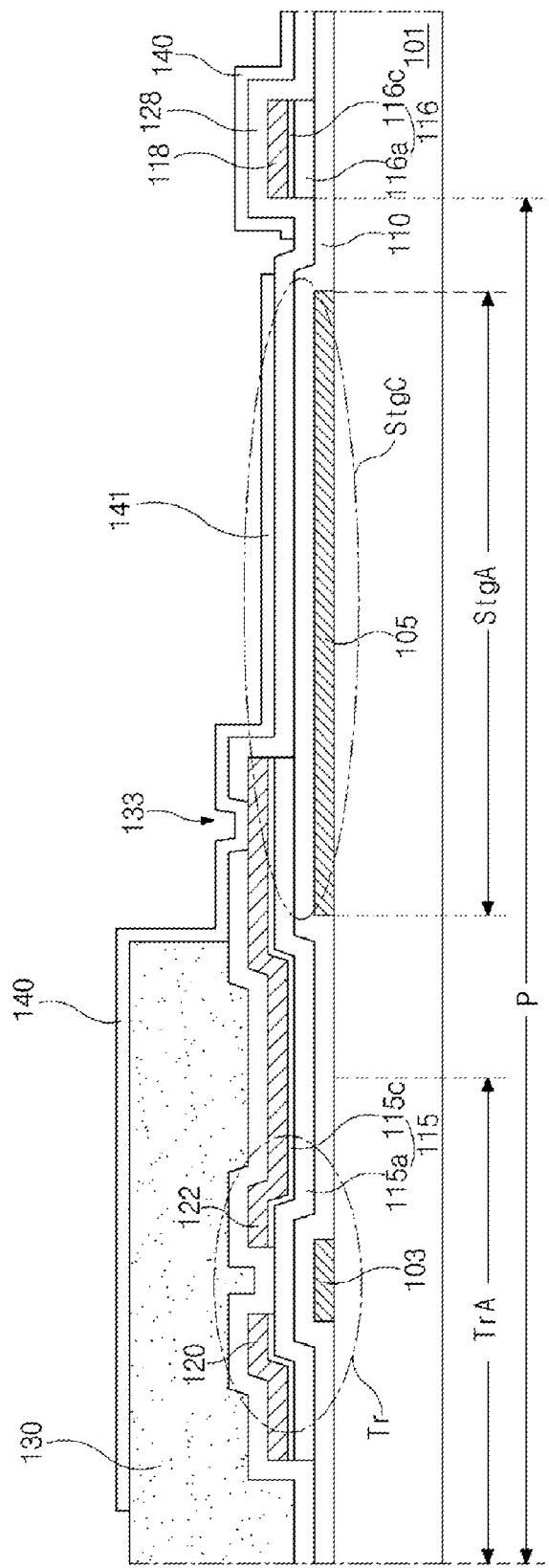
FIG. 6 is a cross-sectional view along the line VI-VI of FIG. 5.

FIG. 5 is a plan view illustrating a pixel region of an array substrate for an electrophoretic display device according to an embodiment of the present invention. FIG. 6 is a cross-sectional view along the line VI-VI of FIG. 5.

In FIG. 5 and FIG. 6, a gate line 107 and a data line 118 are formed on a substrate 101 in a display area of the electrophoretic display device. The gate line 107 and the data line 118 cross each other to define a pixel region P. A gate insulating layer 110 is interposed between the gate and data lines 107 and 118. A common line 104 is formed of the same metallic material on the same layer as the gate line 107. A first storage electrode 105 extending from the common line 104 is disposed in the pixel region P.

A thin film transistor Tr is formed at a crossing portion of the gate line 107 and the data line 118 as a switching element. The thin film transistor Tr includes a gate electrode 103, the gate insulating layer 110, a semiconductor layer 115, and source and drain electrodes 120 and 122 sequentially disposed. The gate electrode 103 is connected to the gate line 107. The semiconductor layer 115 includes an active layer 115a of intrinsic amorphous silicon and ohmic contact layers 115b of impurity-doped amorphous silicon. The source and drain electrodes 120 and 122 are spaced apart from each other. The source electrode 120 is connected to the data line 118.

A first passivation layer 128 covers the thin film transistor Tr and the data line 118. The first passivation layer 128 includes a drain contact hole 133 partially exposing the drain electrode 122 of the thin film transistor Tr. The first passivation layer 128 is formed of an inorganic insulating material. A second passivation layer 130 of an organic insulating material is formed on the first passivation layer 128. The second passivation layer 130 has a thickness of 2 µm to 4 µm. Here, the first passivation layer 128 is disposed on a substantially entire surface of the display area including the thin film transistor Tr. On the other hand, the second passivation layer 130 is disposed on borders of the pixel region P including a switching region TrA where the thin film transistor Tr is disposed, that is, on a region corresponding to the gate line 107 and the data line 118. The first passivation layer 128 protects a channel of the thin film transistor Tr, which is an exposed portion of the active layer 115a between the source and drain electrodes 120 and 122 spaced apart from each other. The first passivation layer 128 improves contact properties between the second passivation layer 130 of the organic insulating material and the source and drain electrodes 120 and 122 of a metallic material. The first passivation layer 128 may be omitted.

A pixel electrode 140 corresponding to the pixel region P is formed on the second passivation layer 130 and the first passivation layer 128, which is exposed by the second passivation layer 130. If the first passivation layer 128 is omitted, the pixel electrode 140 may be disposed on the gate insulating layer 110. The pixel electrode 140 is formed of a transparent conductive material, for example, indium tin oxide or indium zinc oxide. The pixel electrode 140 contacts the drain electrode 122 through the drain contact hole 133. A portion of the pixel electrode 140 overlaps the first storage electrode 105 and functions as a second storage electrode 141. The first and second storage electrodes 105 and 141 constitute a storage capacitor StgC.

Here, to maximize the reflectivity, the pixel electrode 140 overlaps the gate and the data lines 107 and 118 connecting to the thin film transistor Tr in the switching region TrA of the pixel region P. More particularly, the pixel electrode 140 covers the data line 118, and another end of the pixel electrode 140 is disposed in another pixel region next to the pixel region P.

Accordingly, portions corresponding to the gate line 107 and the data line 118 function as reflection regions due to an electrophoresis film (not shown), and an aperture ratio and a reflection efficiency are maximized.

Meanwhile, in the related art, the drain electrode extends into the storage region, and the drain electrode covers more than a half of the pixel region. The drain electrode is several times as large as a drain electrode of a driving thin film transistor in a non-display area. However, in the present invention, the drain electrode 122 has a size which is enough to form the drain contact hole 133 therein and does not have a size as large as the storage region StgA. Therefore, even though the semiconductor layer 115 and the source and drain electrodes 120 and 122 are formed through a mask process including a dry-etching process, problems in patterning do not occur.

As a modified embodiment, although not shown in the figures, a third passivation layer of an inorganic insulating material may be further formed between the pixel electrode 140 and the second passivation layer 130. Since a contact strength between the organic insulating material and the transparent conductive material is weaker than a contact strength between the inorganic insulating material and the transparent conductive material, contact properties can be improved by forming the third passivation layer of the inorganic insulating material between the pixel electrode 140 of the transparent conductive material and the second passivation layer 130 of the organic insulating material.

FIGS. 7A to 7F are plan views showing a pixel region of an array substrate for an electrophoretic display device in each process of manufacturing the array substrate according to the embodiment of the present invention. FIGS. 8A to 8H are cross-sectional views showing a pixel region of an array substrate for an electrophoretic display device in each process of manufacturing the array substrate according to the embodiment of the present invention. FIGS. 8A to 8H correspond to the line VI-VI of FIG. 5. For convenience of explanation, a switching region TrA for a thin film transistor Tr and a storage region StgA for a storage capacitor StgC are defined in the pixel region P.

Figure 7A:
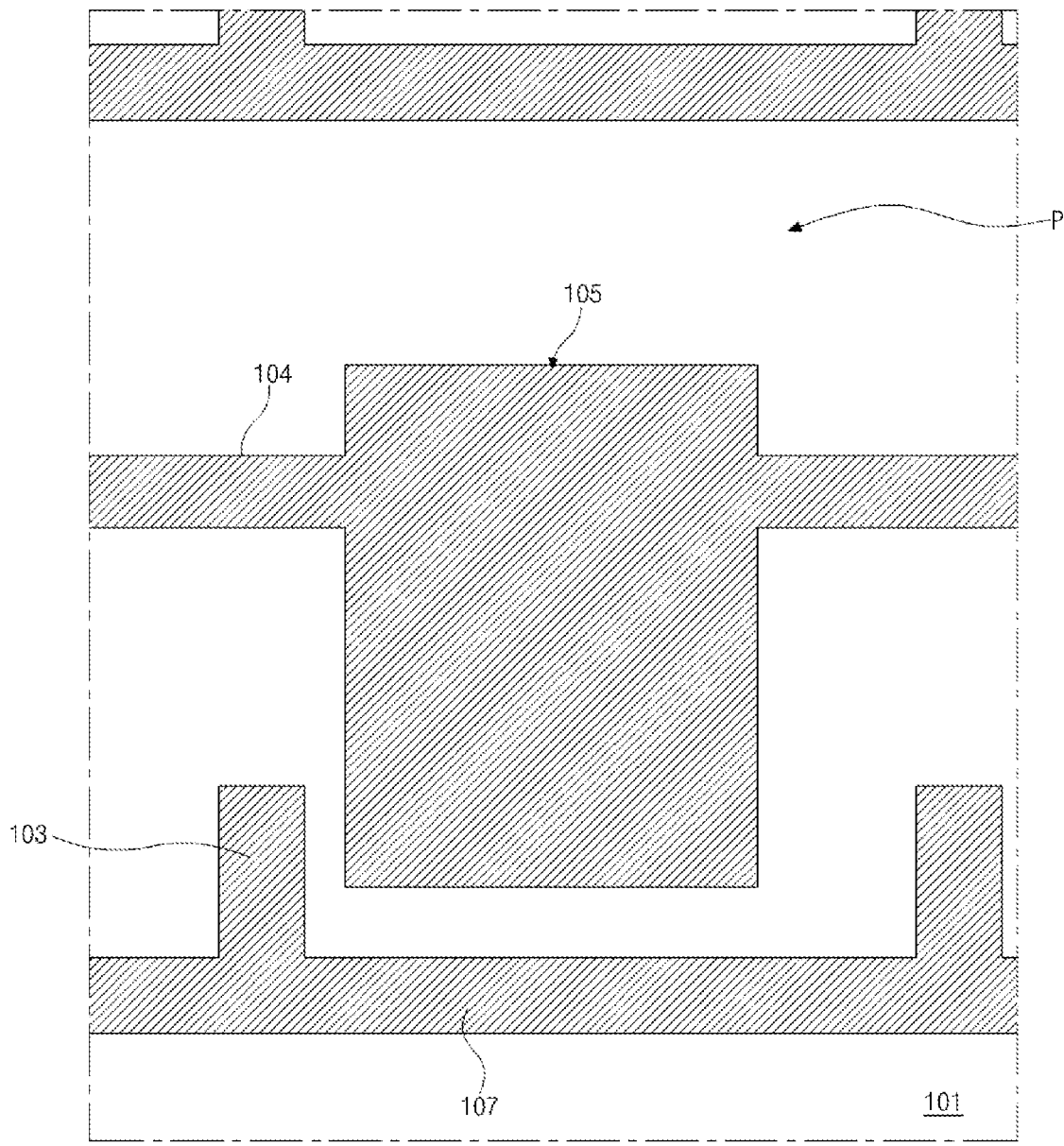
FIGS. 7A to 7F are plan views showing a pixel region of an array substrate for an electrophoretic display device in each process of manufacturing the array substrate according to the embodiment of the present invention.
Figure 8A:
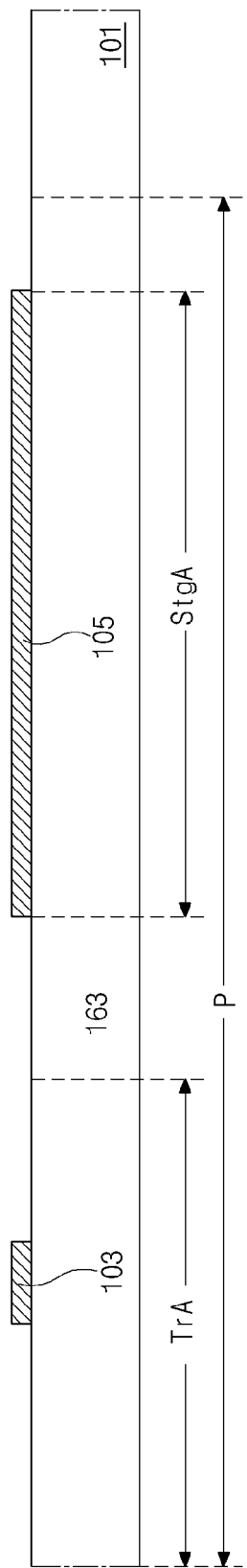
FIGS. 8A to 8H are cross-sectional views showing a pixel region of an array substrate for an electrophoretic display device in each process of manufacturing the array substrate according to the embodiment of the present invention.

In FIG. 7A and FIG. 8A, a first metal layer (not shown) is formed on an insulating substrate 101 by depositing a first metallic material and is patterned through a mask process to thereby form a gate line 107, a common line 104, a gate electrode 103 and a first storage electrode 105. The insulating substrate 101 may be a glass substrate, a plastic substrate, or a metal substrate with an insulating layer thereon. The first metallic material may include aluminum (Al), aluminum alloy (AlNd), copper (Cu), copper alloy, chromium (Cr) or titanium alloy. The mask process may include applying photoresist, exposing the photoresist to light through a mask, developing the photoresist, etching, and stripping the photoresist. The gate line 107 extends along a first direction. The common line 104 is spaced apart from and parallel to the gate line 107. The gate electrode 103 is disposed in the switching region TrA and is connected to the gate line 107. The first storage electrode 105 is disposed in the storage region StgA and extends from the common line 104.

Here, the first metal layer may have a double-layered structure by sequentially depositing different metallic materials. Then, by patterning the double-layered first metal layer, the gate line 107, the gate electrode 103, the common line 104 and the first storage electrode 105 may have a double-layered structure of, for example, aluminum alloy(AlNd)/molybdenum (Mo) or titanium alloy/copper (Cu). For convenience, the gate line 107, the gate electrode 103, the common line 104 and the first storage electrode 105 having a single-layered structure are shown in the figures.

Figure 7B:
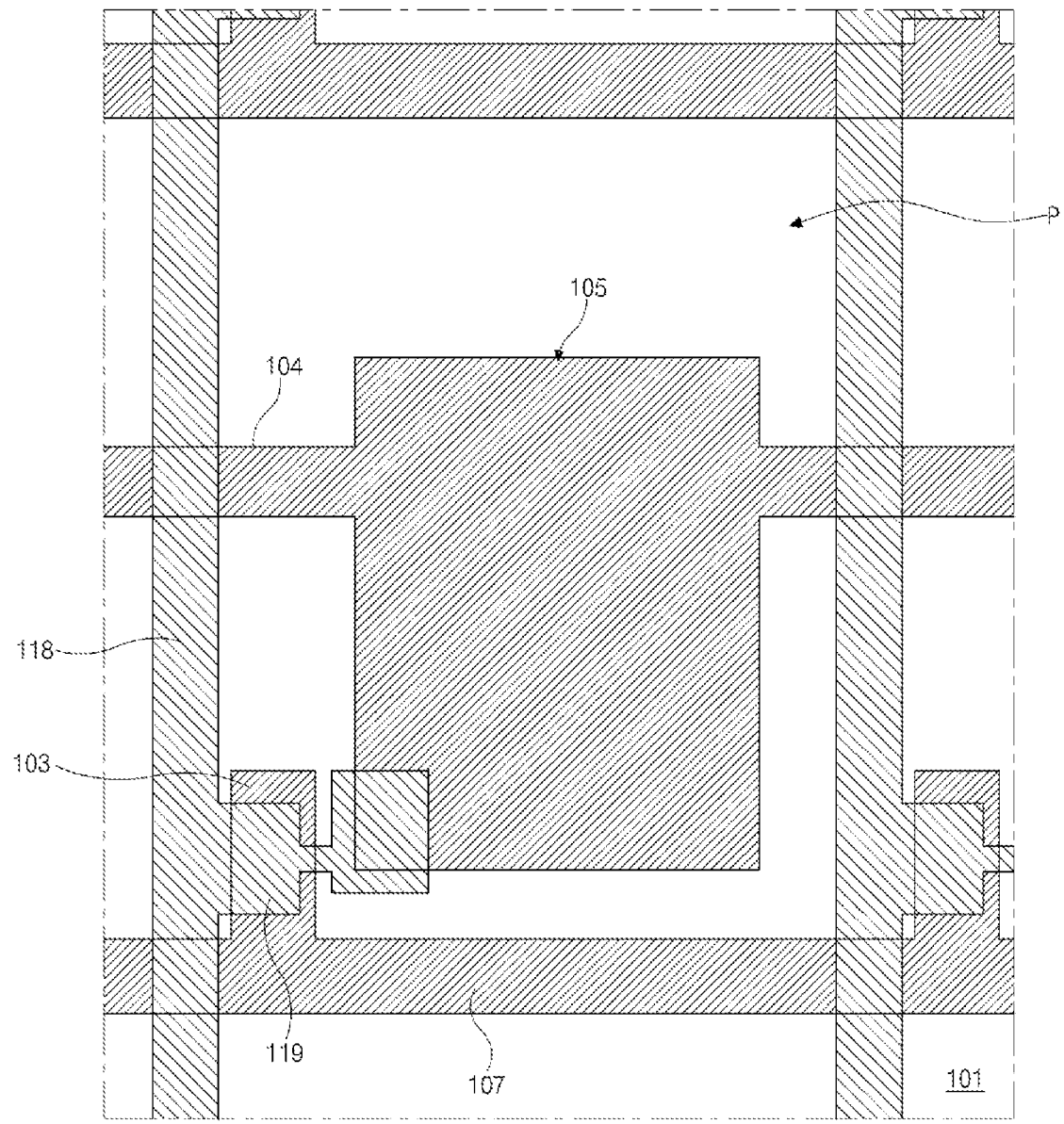
Figure 8B:
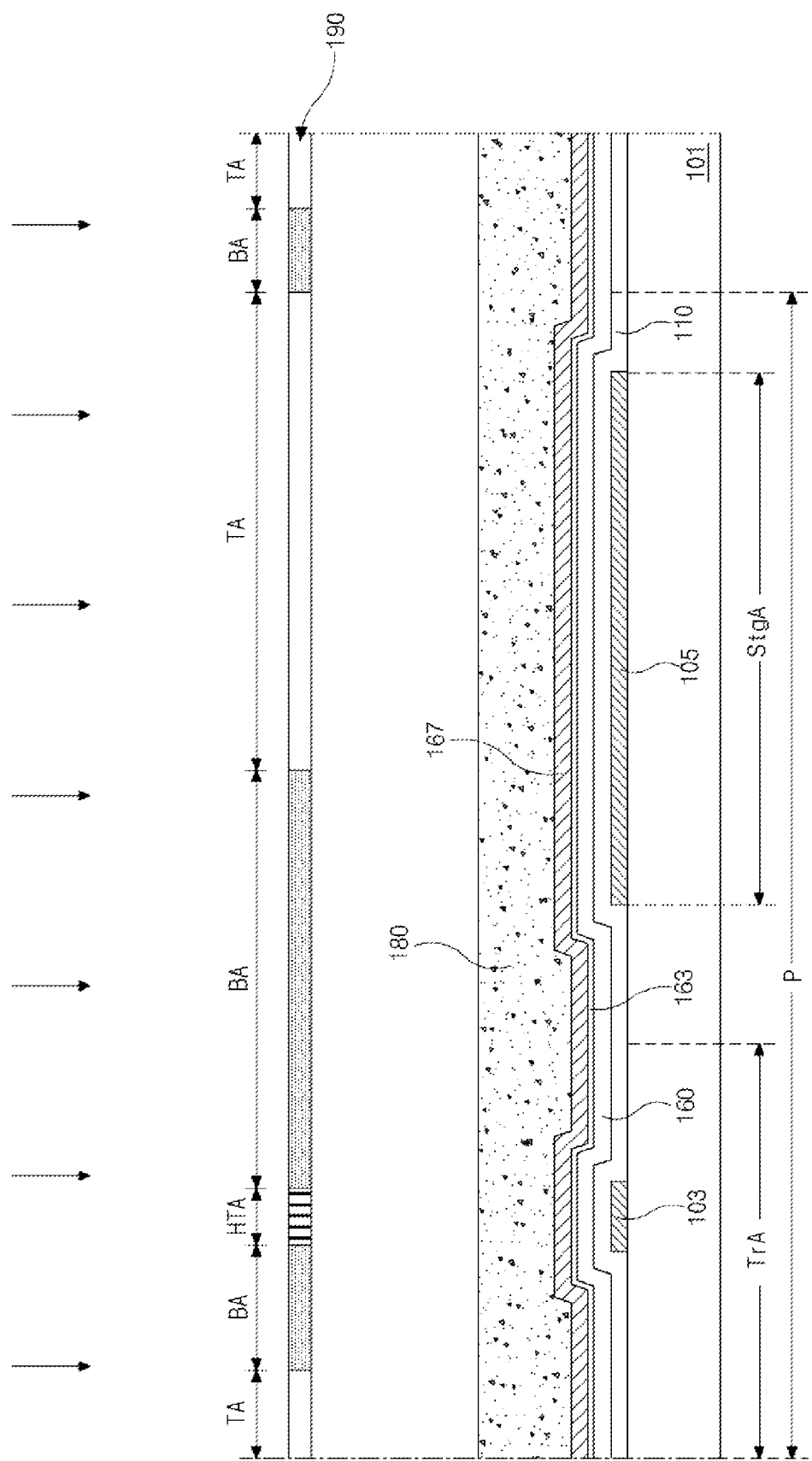

In FIG. 7B and FIG. 8B, a gate insulating layer 110 is formed on a substantially entire surface of the insulating substrate 101 including the gate line 107, the gate electrode 103, the common line 104 and the first storage electrode 105 by depositing an inorganic insulating material such as silicon oxide ($SiO_2$) or silicon nitride (SiNx).

An intrinsic amorphous silicon layer 160 and an impurity-doped amorphous silicon layer 163 are sequentially formed on the gate insulating layer 110 by depositing intrinsic amorphous silicon and impurity-doped amorphous silicon. Then, a second metal layer 167 is formed on a substantially entire surface of the impurity-doped amorphous silicon layer 163 by depositing one of molybdenum (Mo), chromium (Cr) or molybdenum-titanium (MoTi).

A photoresist layer 180 is formed on the second metal layer 167 by applying photoresist to the second metal layer 167. The photoresist layer 180 is a positive type, in which a portion exposed to light is removed after developing. Alternatively, a negative type, in which a portion exposed to light remains after developing, may be used for the photoresist layer 180. In this case, the same results as the positive type may be obtained when a mask having light-transmitting and light-blocking portions opposite to a mask 190 of FIG. 8B, which will be explained later.

Next, the mask 190 is disposed over the photoresist layer 180. The mask 190 includes a light-transmitting portion TA, a light-blocking portion BA and a half light-transmitting portion HTA. The half light-transmitting portion HTA may include slits or multiple layers to control the amount of light and have a transmittance lower than the light-transmitting portion TA and higher than the light-blocking portion BA. The photoresist layer 180 is exposed to light through the mask 190. The light-exposing method using a mask with the half light-transmitting portion may be referred to as a diffraction exposure method or a halftone exposure method.

Here, the light-blocking portion BA of the mask 190 corresponds to an area where a data line and source and drain electrodes will be formed, the half light-transmitting portion HTA corresponds to an area between the source and drain electrodes in the switching region TrA, that is, an area where a channel will be formed, and the light-transmitting portion TA corresponds to the rest areas.

Figure 8C:
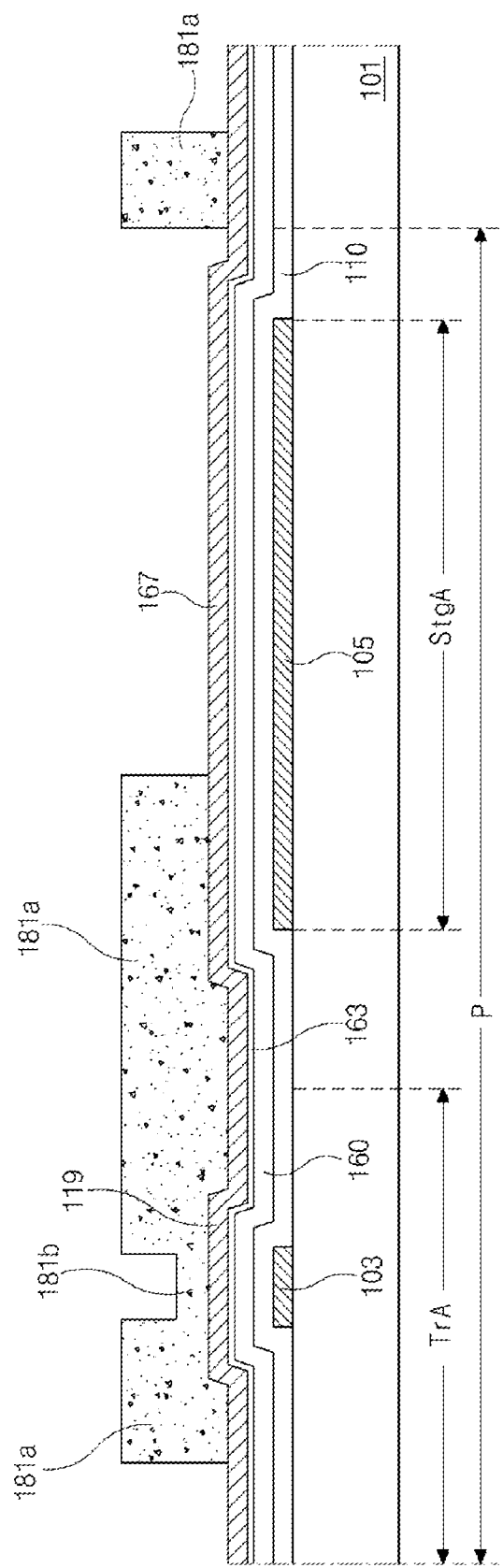

In FIG. 7B and FIG. 8C, the photoresist layer 180 of FIG. 8B exposed to light is developed, and a first photoresist pattern 181a and a second photoresist pattern 181b are formed on the second metal layer 167. The first photoresist pattern 181a corresponds to the area where the data line and the source and drain electrodes will be formed. The second photoresist pattern 181b has a thinner thickness than the first photoresist pattern 181a and corresponds to the area between the source and drain electrodes, that is, the area where the channel will be formed over the gate electrode 103. In the rest areas, the photoresist layer 180 of FIG. 8B is removed, and the second metal layer 167 is exposed.

Figure 8D:
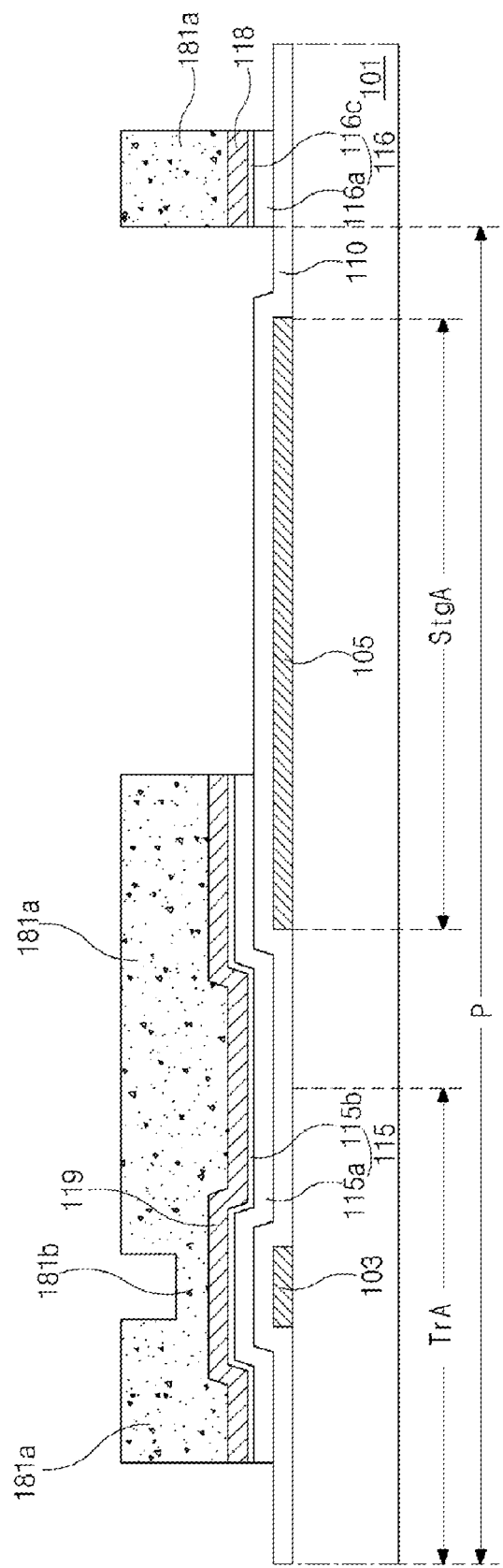

In FIG. 7B and FIG. 8D, a first dry-etching process is performed, and the second metal layer 167 of FIG. 8C exposed by the first and second photoresist patterns 181a and 181b is removed to thereby form the data line 118 and a source drain pattern 119. The data line 118 crosses the gate line 107 to define the pixel region P. The source drain pattern 119 is connected to the data line 118 and is disposed in the switching region TrA. The first dry-etching process may be carried out in a vacuum chamber (not shown) under a first gas mode.

Subsequently, a second dry-etching process is performed, and the impurity-doped amorphous silicon layer 163 of FIG. 8C, which is exposed by the data line 118 and the source drain pattern 119, and the intrinsic amorphous silicon layer 160 of FIG. 8C thereunder are removed to thereby form an ohmic contact pattern 115b, an active layer 115a and a semiconductor pattern 116. The second dry-etching process may be carried out in the vacuum chamber under a second gas mode. The active layer 115a and the ohmic contact pattern 115b are disposed under the source drain pattern 119 in the switching region TrA. The active layer 115a and the ohmic contact pattern 115b have substantially the same shape and the same sized as the source drain pattern 119. The semiconductor pattern 116 is disposed under the data line 118 and includes first and second patterns 116a and 116c, which are formed of the same material and on the same layer as the active layer 115a and the ohmic contact pattern 115b, respectively.

Figure 7C:
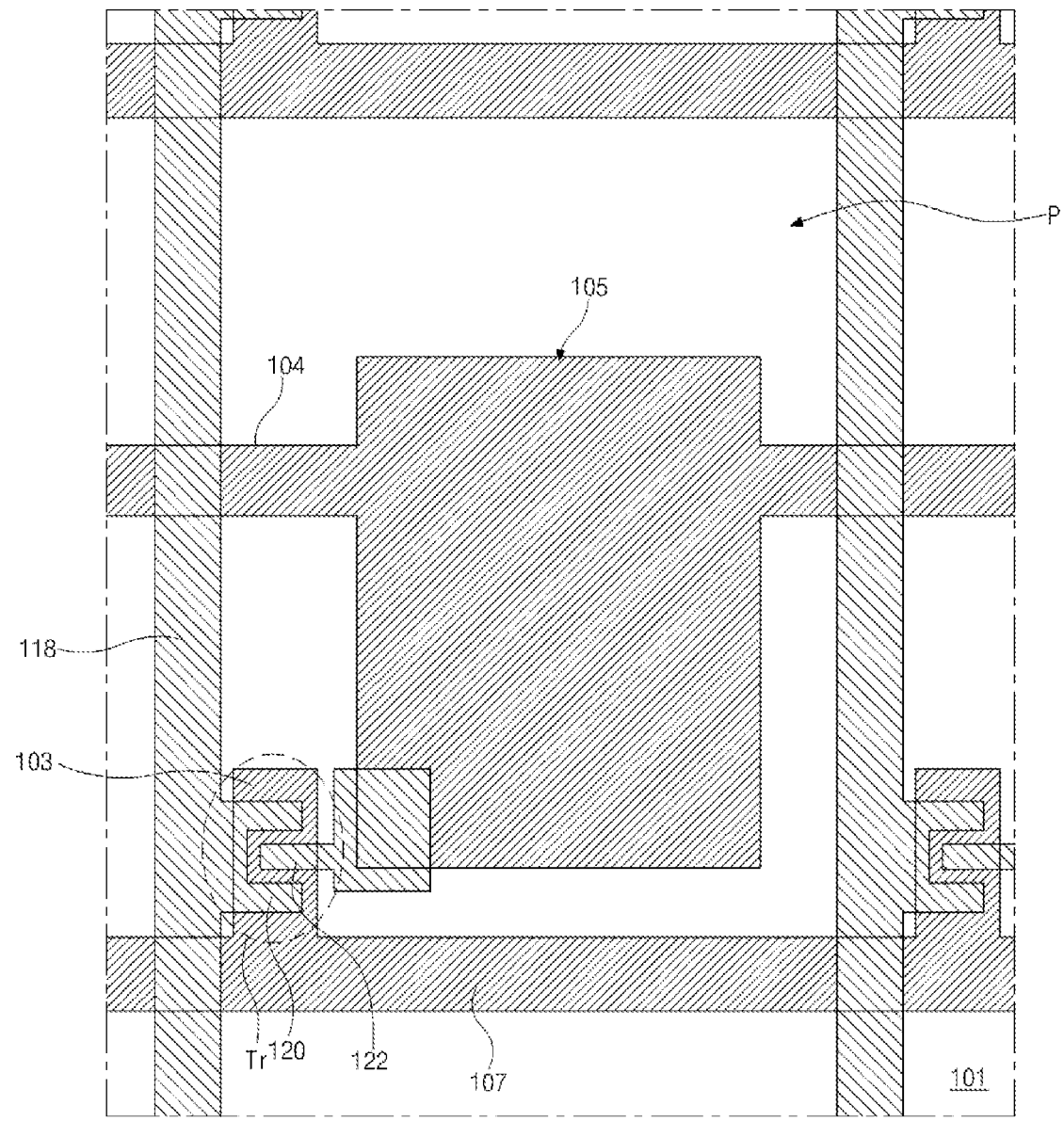
Figure 8E:
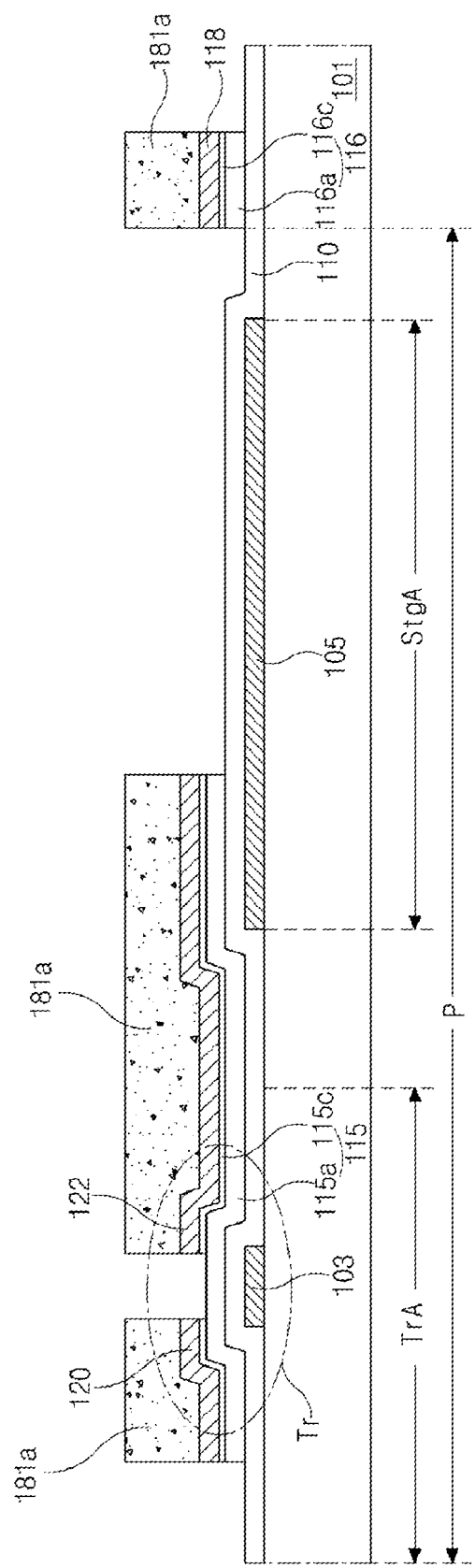

In FIG. 7C and FIG. 8E, an ashing process is performed on the substrate 101 including the ohmic contact pattern 115b of FIG. 8D, and the second photoresist pattern 181b of FIG. 8D is removed to thereby expose a central part of the source drain pattern 119 of FIG. 7B and FIG. 8D formed in the switching region TrA. At this time, the thickness of the first photoresist pattern 181a is also reduced.

Next, a third dry-etching process is performed under the first gas mode, and the central part of the source drain pattern 119 of FIG. 7B and FIG. 8D is removed. Therefore, source and drain electrodes 120 and 122 spaced apart from each other are formed in the switching region TrA.

Subsequently, a fourth dry-etching process is performed under the second gas mode, and a central part of the ohmic contact pattern 115b of FIG. 8D, which is exposed by the source and drain electrodes 120 and 122, is removed to thereby form ohmic contact layers 115c spaced apart from each other and expose the active layer 115a. The active layer 115a and the ohmic contact layers 115c may constitute a semiconductor layer 115. The gate electrode 103, the gate insulating layer 110, the semiconductor layer 115 and the source and drain electrodes 120 and 122 sequentially disposed in the switching region TrA form a thin film transistor.

Meanwhile, during the four dry-etching process, there is little non-uniformity in patterns, which may be caused by different occupying ratios per unit area of a metallic material for the source and drain electrodes 120 and 122. In the present invention, the drain electrode 122 does not include a part for an electrode of the storage capacitor, which has more than a half size of the pixel region P. The drain electrode 122 contacts a pixel electrode through a drain contact hole, which will be formed later, and provides signals to the pixel electrode. The drain electrode 122 has such a size that the drain contact hole is formed within boundaries of the drain electrode 122. Accordingly, the size of the drain electrode 122 is similar to a size of a drain electrode of a driving thin film transistor, which functions as a driving element in a non-display area. The occupying ratios per unit area of a metallic material for the source and drain electrodes 120 and 122 are uniform all over the substrate 101. Therefore, the reactive gases are not concentrated on specific areas of the substrate 101 during the dry-etching process.

Figure 7D:
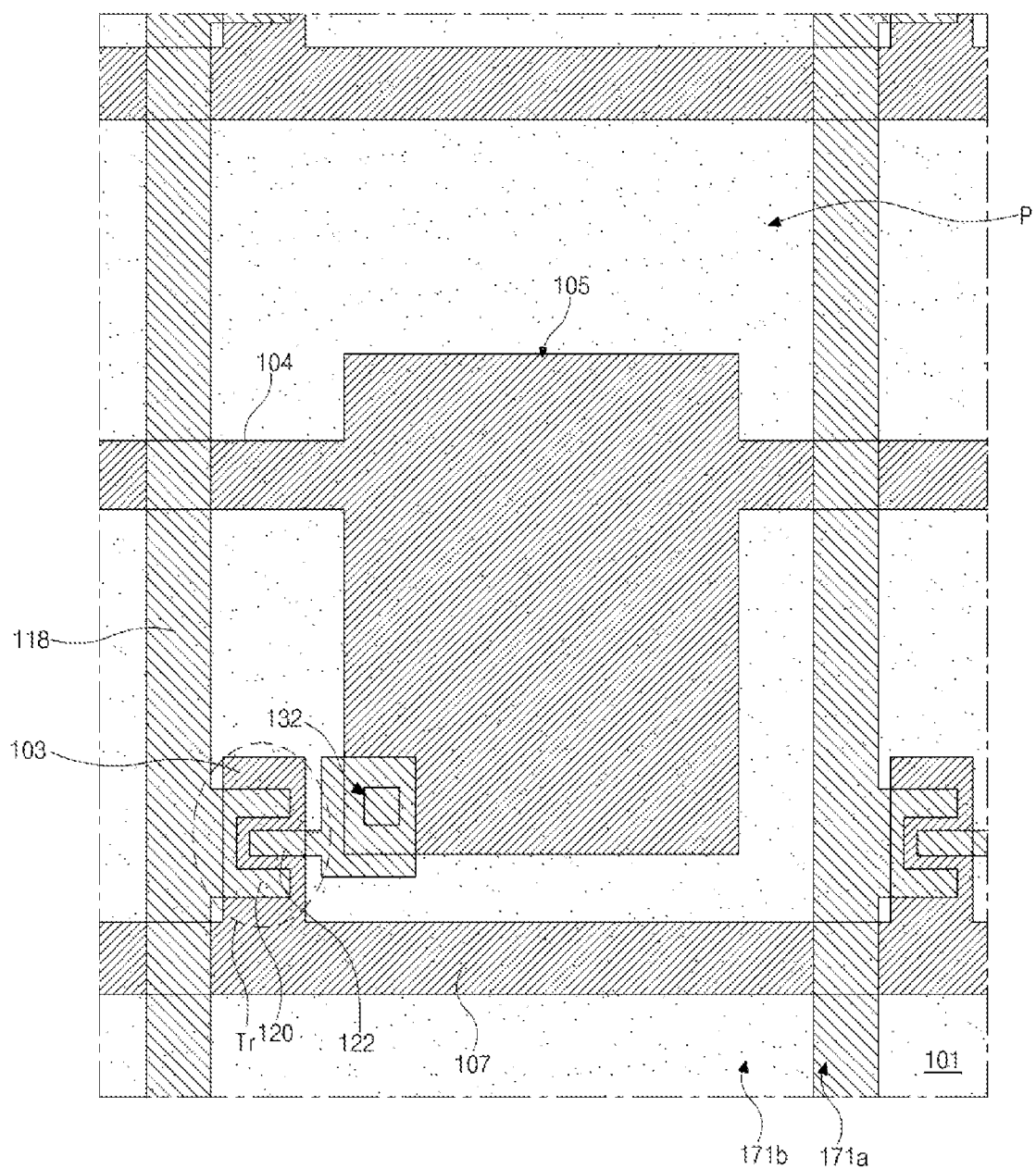
Figure 8F:
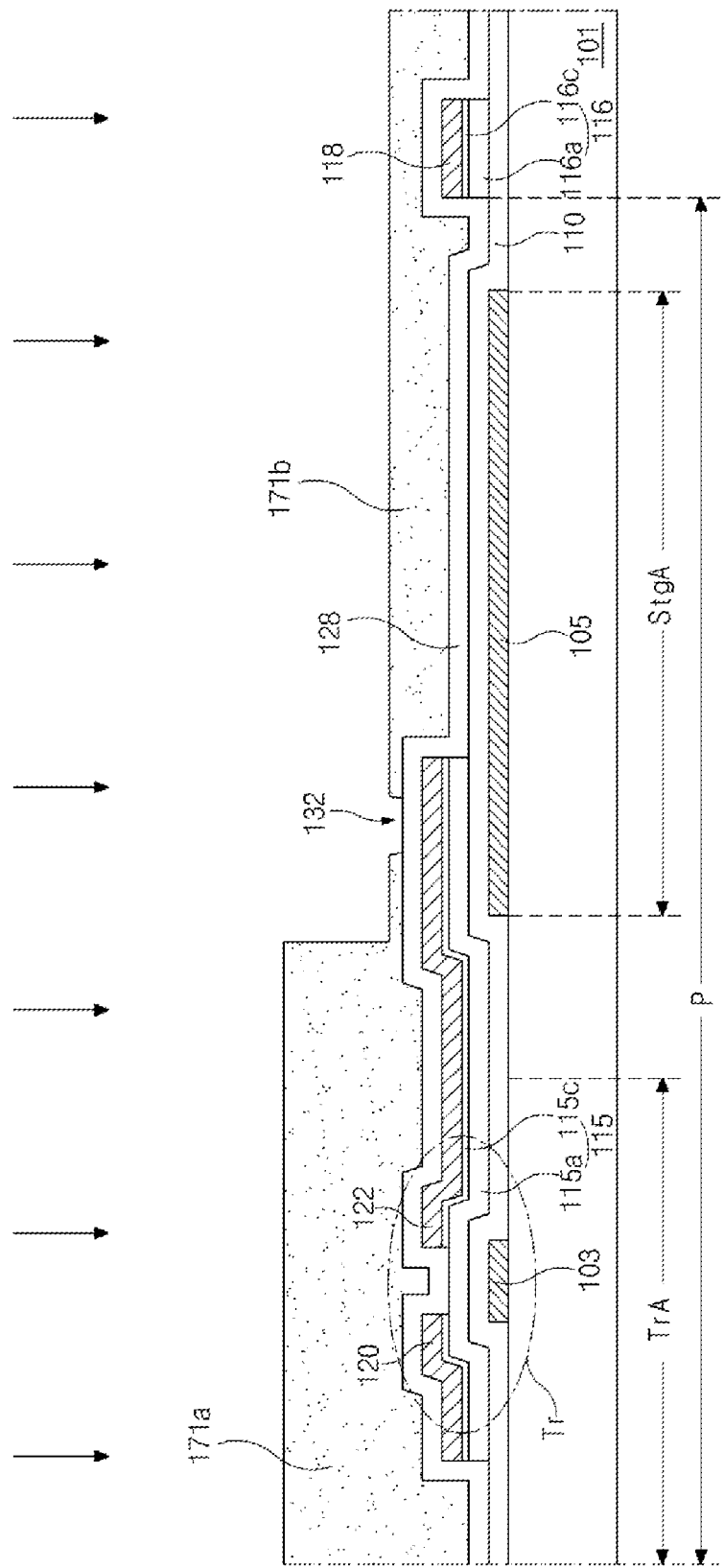

In FIG. 7D and FIG. 8F, an aching or stripping process is performed, and the first photoresist pattern 181a of FIG. 8E is removed. Then, a first passivation layer 128 is formed on a substantially entire surface of the substrate 101 including data line 118 and the source and drain electrodes 120 and 122 by depositing an inorganic insulating material such as silicon oxide (SiO2) or silicon nitride (SiNx). Subsequently, an organic insulating layer (not shown) is formed on the first passivation layer 128 by applying an organic insulating material such as photo acryl or benzocyclobutene (BCB) to the first passivation layer 128. The organic insulating layer has an even surface and has a first thickness of about 3 µm (micrometers) to about 5 µm (micrometers). Next, the organic insulating layer is exposed to light by using a mask (not shown) having a light-transmitting portion, a half light-transmitting portion and a light-blocking portion and then is developed to thereby form a first organic insulating pattern 171a, a second insulating pattern 171b and a through hole 132. The through hole 132 exposes a first passivation layer 128 and corresponds to an area where a drain contact hole will be formed over the drain electrode 122. The first organic insulating pattern 171a has the first thickness and corresponds to the switching region TrA and the gate and data lines 107 and 118. The second organic insulating pattern 171b has a second thickness less than the first thickness and corresponds to the rest region. The second thickness may be 1 µm (micrometer).

Figure 7E:
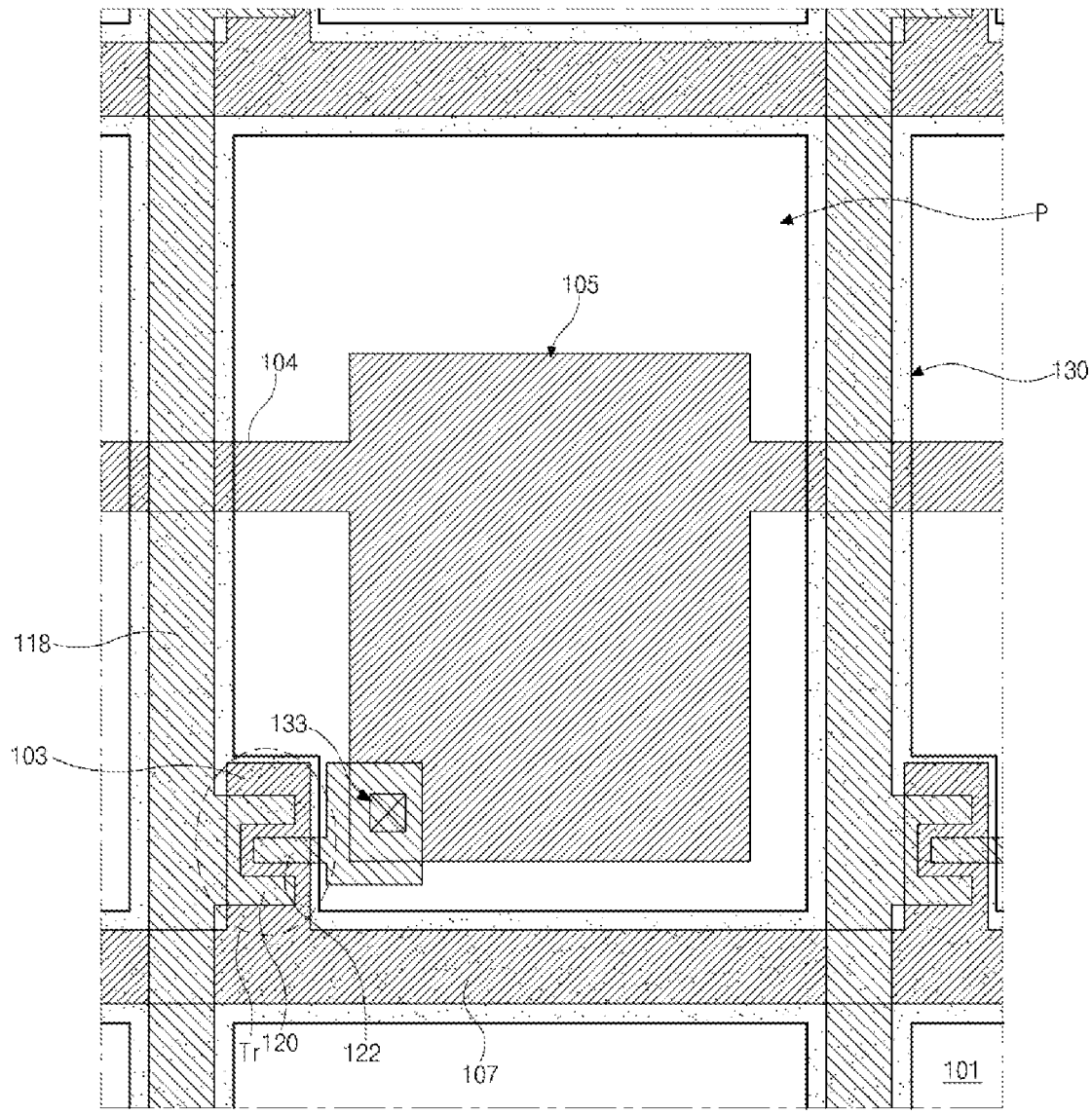
Figure 8G:
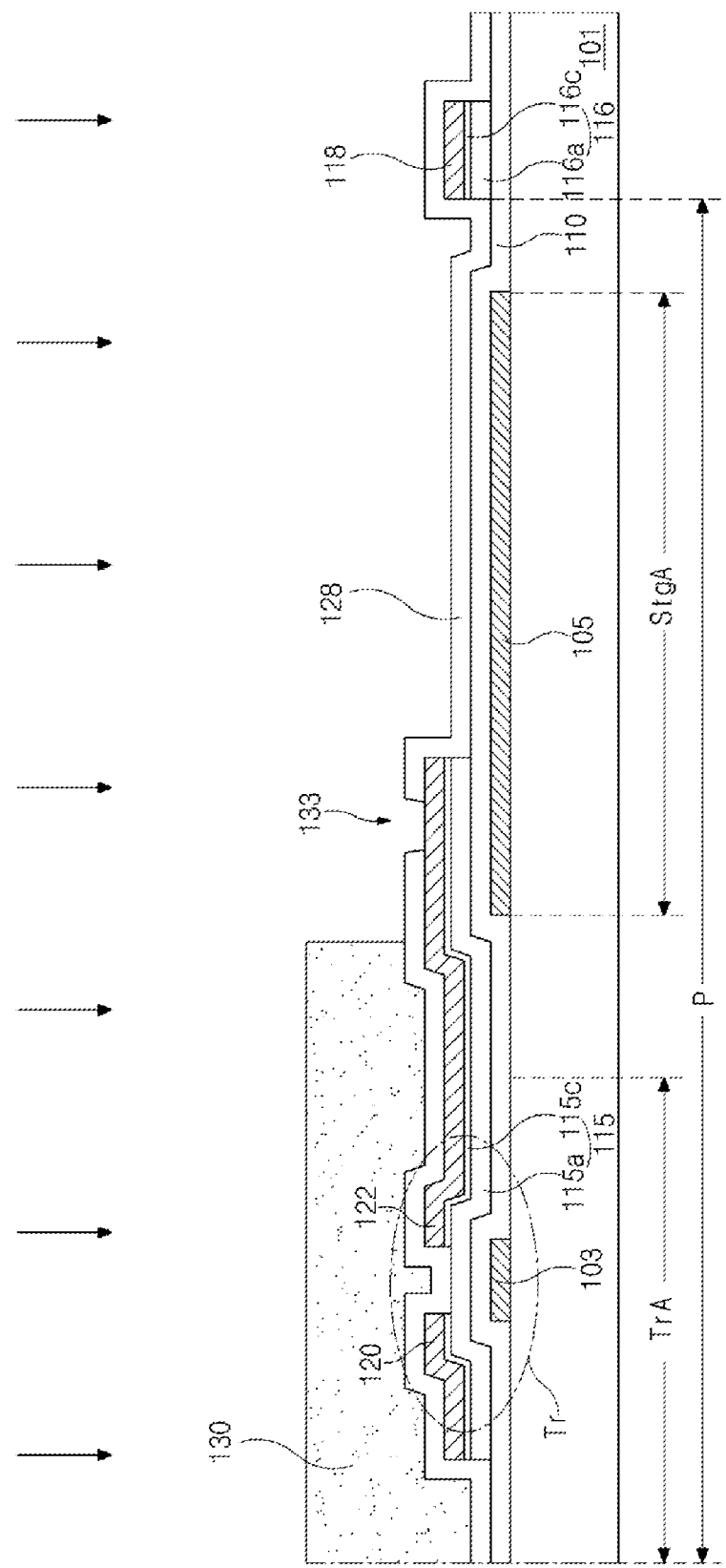

In FIG. 7E and FIG. 8G, a fifth dry-etching process is performed under a third gas mode, and the first passivation layer 128 exposed through the through hole 132 of FIG. 8F is removed to thereby form a drain contact hole 133, which partially exposes the drain electrode 122. Next, an ashing process is performed or a sixth dry-etching process is performed under a fourth gas mode, and the second organic insulating pattern 171b of FIG. 8F having the second thickness is removed to thereby expose the first passivation layer 128 in the pixel region P. Here, the first thickness of the first insulating pattern 171 a of FIG. 8F is also reduced by the second thickness through the ashing or sixth etching process, and a second passivation layer 130 is formed to have a third thickness of about 2 µm (micrometers) to 4 µm (micrometers). The second passivation layer 130 is formed in the switching region TrA and boundaries of the pixel region P, that is, corresponds to the gate and data lines 107 and 118.

Here, the first passivation layer 128 of an inorganic insulating material may be omitted. In this case, the gate insulating layer 110 may be exposed by removing the second organic insulating pattern 171b of FIG. 8F through the ashing or sixth dry-etching process.

Meanwhile, before the organic insulating layer is formed, the drain contact hole 133 exposing the drain electrode 122 of the thin film transistor Tr may be formed by patterning the first passivation layer 128. At this time, the second passivation layer 130 can be formed using a mask consisting of a light-transmitting portion and a light-blocking portion.

As a modified embodiment, although not shown in the figures, to improve contact properties between the second passivation layer 130 and the pixel electrode to be formed thereon, a third passivation layer of an inorganic insulating material may be formed to cover the second passivation layer 130. The third passivation layer has the same shape as the second passivation layer 130. That is, ends of the third passivation layer coincide with ends of the second passivation layer 130. The third passivation layer may be patterned through another mask process.

Alternatively, the third passivation layer may be patterned through the same mask process as the second passivation layer 130. More particularly, the organic insulating layer (not shown) for the second passivation layer 130 may be formed, and an inorganic insulating layer may be formed on the organic insulating layer by depositing the inorganic insulating layer. Then, a photoresist layer may be formed on the inorganic insulating layer. The photoresist layer may be exposed to light by the above-mentioned diffraction exposure method or halftone exposure method and may be developed to thereby form third and fourth photoresist patterns (not shown). The third photoresist pattern may have a thicker thickness than the fourth photoresist pattern. Next, the drain contact hole 133 may be formed by sequentially removing the inorganic insulating layer, the organic insulating layer and the first passivation layer 128 using the photoresist patterns as an etching mask. The fourth photoresist pattern may be removed by an aching process, and the inorganic insulating layer corresponding to the pixel region P may be exposed. The exposed inorganic insulating layer and the organic insulating layer thereunder may be removed, and thus the second passivation layer 130 and the third passivation layer (not shown) may be formed to correspond to the gate and data lines 107 and 118 and the switching region TrA.

Figure 7F:
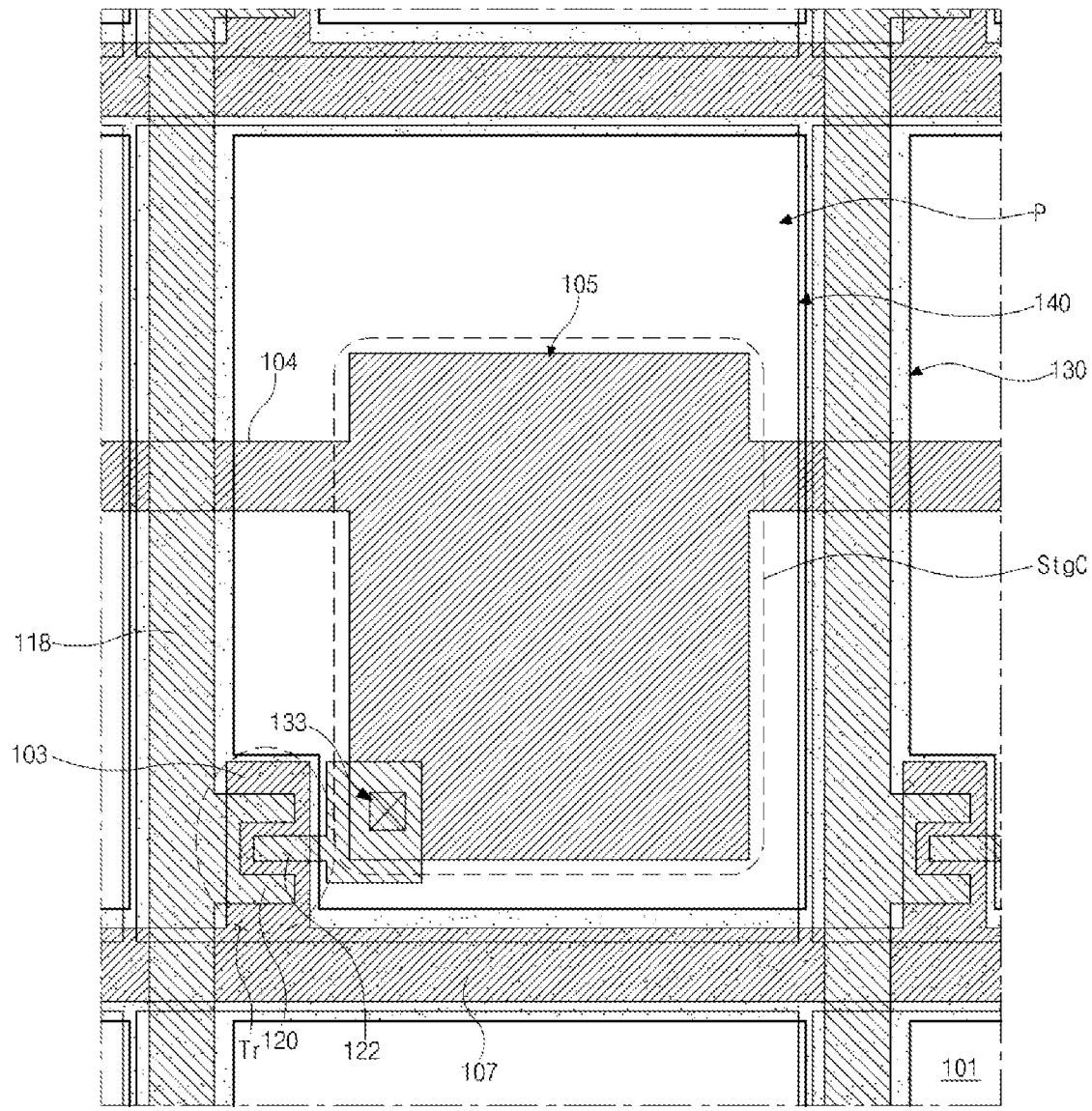
Figure 8H:
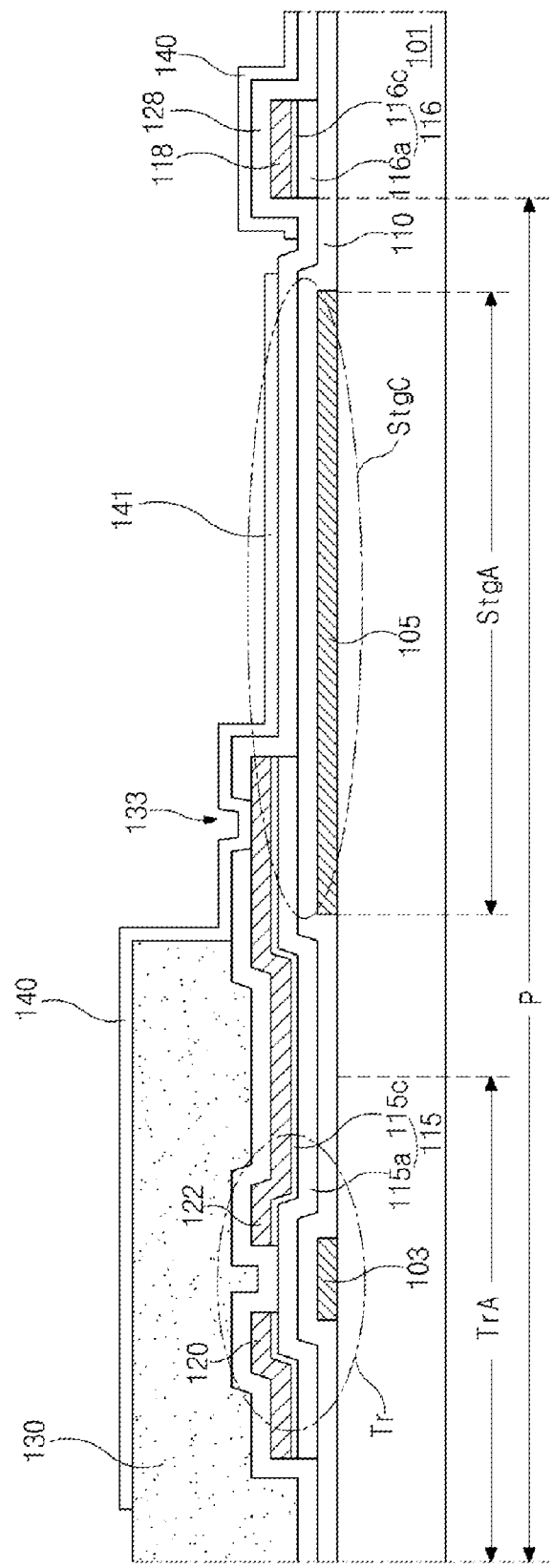

Next, in FIG. 7F and FIG. 8H, a transparent conductive material layer (not shown) is formed on the second passivation layer 130 by depositing a transparent conductive material such as indium tin oxide, indium zinc oxide or indium tin zinc oxide. The transparent conductive material layer is patterned through a mask process to thereby form a pixel electrode 140 in the pixel region P. The pixel electrode 140 contacts the drain electrode 122 of the thin film transistor Tr through the drain contact hole 133. To maximize the reflectivity, the pixel electrode 140 overlaps the gate line 107 and the data line 118 connected to the thin film transistor Tr. An end of the pixel electrode 140 is disposed in a next pixel region adjacent to the data line 118.

Here, a part of the pixel electrode 140 in the storage region StgA becomes a second storage electrode 141. The second storage electrode 141 and the first storage electrode 105 thereunder constitute a storage capacitor StgC with the gate insulating layer 110 and the first passivation layer 128 or the gate insulating layer 110 therebetween as a dielectric substance.

Like this, since the storage capacitor StgC in each pixel region P of the present invention includes the first storage electrode 105, which extends from the common line 104, and the second storage electrode 141, which is a part of the pixel electrode 140, the capacitance of the storage capacitor StgC is similar to that of the related art. In addition, even though the size of the storage capacitor StgC increases in the pixel region P in order to increase the capacitance of the storage capacitor StgC, the drain electrode 122 does not affect the capacitance of the storage capacitor StgC, and it is not needed to increase the size of the drain electrode 122. Therefore, it is prevented that there occurs non-uniform patterns due to the occupying ratios per unit area of the drain electrode all over the substrate 101.

Moreover, in the present invention, because the pixel electrode 140 has a size corresponding to substantially the entire portion of the pixel region P, the capacitance of the storage capacitor StgC is easily increased by enlarging the first storage electrode 105 extending from the common line 104.

In the meantime, although not shown in the figure, an electrophoresis film, which includes a base film, a common electrode, an ink layer and an adhesive layer in order, is disposed over the array substrate such that the ink layer is interposed between the common electrode and the pixel electrode and the adhesive layer faces the pixel electrode, and then the electrophoresis film and the array substrate are attached to each other, whereby the electrophoretic display device is completed. Here, the base film may be formed of a transparent and flexible material, for example, PET. The common electrode is formed of a transparent conductive material and is formed on a substantially entire surface of the base film. The ink layer includes capsules, each of which has a plurality of white-dyed particles and a plurality of black-dyed particles negatively and positively charged by a condensation polymerization reaction, respectively.

To manufacture an electrophoretic display device displaying color images, a color filter layer including red, green and blue color filter patterns may be formed on the electrophoresis film attached to the display area of the array substrate according to the following processes: one of red, green and blue color resists, for example, a red color resist may be applied to the electrophoresis film by a coating method such as a spin coating method, thereby forming a red color filter layer (not shown), the red color filter layer may be exposed to light through a mask, which includes a light-transmitting portion and a light-blocking portion, and then developed to thereby form red color filter patterns, which correspond to some pixel regions, and then green and blue color filter patterns may be formed similarly to the red color filter pattern.

Then, a counter substrate (not shown) may be disposed over the color filter layer, a seal pattern (not shown) may formed along the non-display area at peripheries of the display area, and the counter substrate may be attached to the array substrate such that the display area is screened, whereby the electrophoretic display device displaying color images can be completed. The counter substrate may be plastic, which is transparent and flexible. The counter substrate may be attached to the electrophoresis film or the color filter layer using an adhesive layer, and in this case, the seal pattern may be omitted.

Even though the color filter layer is formed on the electrophoresis film in the above-mentioned embodiment, the color filter layer may be formed on the counter substrate and then may be attached to the array substrate including the electrophoresis film.

In the present invention, since the pixel electrode functions as the second electrode of the storage capacitor, the capacitance of the storage capacitor is not reduced as compared to the related art, and the occupying ratios per unit area of the drain electrode in the display area and the non-display area are similar to each other. Therefore, even though the semiconductor layer and the source and drain electrodes are formed through a mask process, uniform patterns are formed in the display area and the non-display area. In addition, manufacturing processes are simplified due to reduction of one mask process, and costs and productivity can be improved.

Moreover, the pixel electrode is maximized in the pixel region, and the reflectivity of the electrophoretic display device is increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an electrophoretic display device, comprising:
   forming a gate line along a direction, a gate electrode extending from the gate line, a common line parallel to the gate line, and a first storage electrode extending from the common line on a substrate;
   forming a gate insulating layer on an entire surface of the substrate including the gate line, the gate electrode, the common line and the first storage electrode;
   forming a semiconductor layer, a data line, and source and drain electrodes through a mask process, wherein the semiconductor layer is disposed over the gate electrode, the data line crosses the gate line to define a pixel region, the source electrode extends from the data line, and the drain electrode is spaced apart from the source electrode over the semiconductor layer, wherein the gate electrode, the semiconductor layer, the source electrode and the drain electrode constitute a thin film transistor;
   forming a first passivation layer over the gate line, the data line and the thin film transistor, wherein the first passivation layer partially exposes the drain electrode; and
   forming a pixel electrode on the first passivation layer, wherein the pixel electrode contacts the drain electrode and overlaps the gate line and the data line, wherein the pixel electrode includes a second storage electrode overlapping the first storage electrode, and the first and second storage electrodes form a storage capacitor with the gate insulating layer interposed therebetween.

2. The method according to claim 1, wherein the first passivation layer is formed of an organic insulating material.

3. The method according to claim 1, wherein the pixel electrode is formed of a transparent conductive material.

4. The method according to claim 1, wherein the pixel electrode has a size corresponding to substantially the entire portion of the pixel region.

5. The method according to claim 1, wherein the mask process includes a diffraction exposure method or a halftone exposure method using a mask, which includes a light-transmitting portion, a half light-transmitting portion and a light-blocking portion.

6. The method according to claim 1, further comprising forming a second passivation layer covering the thin film transistor and the data line before forming the first passivation layer, wherein the second passivation layer is formed of an inorganic insulating material and includes a drain contact hole exposing the drain electrode.

7. The method according to claim 6, wherein the first and second storage electrodes form the storage capacitor with the gate insulating layer and the second passivation layer interposed therebetween.

8. The method according to claim 1, wherein forming the first passivation layer includes:
   forming an organic insulating material layer on an entire surface of the substrate including the second passivation layer;
   exposing the organic insulating material layer to light using a diffraction exposure method or a halftone exposure method and developing the organic insulating material, thereby forming a first organic insulating pattern, a second organic insulating pattern and a through hole, wherein the through hole exposes the second passivation layer over the drain electrode, wherein the first organic insulating pattern has a first thickness and corresponds to the gate line, the data line and the thin film transistor, wherein the second organic insulating pattern has a second thickness less than the first thickness and corresponds to the pixel region;
   forming the drain contact hole by selectively removing the second passivation layer; and
   forming the first passivation layer having a third thickness by completely removing the second organic insulating pattern and partially removing the first organic insulating pattern.

9. The method according to claim 1, wherein forming the first passivation layer uses a dry-etching method.

10. The method according to claim 1, further comprising forming a third passivation layer on the first passivation layer before forming the pixel electrode, wherein the third passivation layer is formed of an inorganic insulating material.

11. The method according to claim 1, wherein the first passivation layer has a thickness of about 2 μm to about 4 μm.

12. The method according to claim 1, further comprising attaching an electrophoresis film including an adhesive layer, an ink layer having a charged particle, a common electrode and a base film onto the pixel electrode, the ink layer disposed between the adhesive layer and the base film, the adhesive layer being on the pixel electrode, the charged particle including a negatively-charged sub-particle having a white color and a positively-charged sub-particle having a black color.

* * * * *